(12) United States Patent
Edwards et al.

(10) Patent No.: US 10,489,354 B2
(45) Date of Patent: Nov. 26, 2019

(54) STORAGE SYSTEMS FOR CONTAINERS

(71) Applicant: HEWLETT PACKARD ENTERPRISE DEVELOPMENT LP, Houston, TX (US)

(72) Inventors: Nigel Edwards, Bristol (GB); Chris I Dalton, Bristol (GB); Venkataraman Kamalaksha, Bangalore (IN); Kishore Kumar M, Bangalore (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 355 days.

(21) Appl. No.: 15/224,236

(22) Filed: Jul. 29, 2016

(65) Prior Publication Data
US 2018/0032258 A1 Feb. 1, 2018

(51) Int. Cl.
G06F 16/185 (2019.01)
G06F 3/06 (2006.01)
G06F 16/182 (2019.01)
G06F 16/13 (2019.01)

(52) U.S. Cl.
CPC .......... G06F 16/185 (2019.01); G06F 3/0604 (2013.01); G06F 3/067 (2013.01); G06F 3/0647 (2013.01); G06F 16/13 (2019.01); G06F 16/184 (2019.01)

(58) Field of Classification Search
CPC ............ G06F 17/30088; G06F 17/301; G06F 17/3028; G06F 17/30619; G06F 17/30091; G06F 17/30212; G06F 17/30221; G06F 8/63; G06F 3/065; G06F 3/0619; G06F 3/0643; G06F 3/067; G06F 3/0647; G06F 16/182; G06F 16/122; G06F 16/13; G06F 16/184; G06F 16/185; G06F 16/27
USPC ......................................... 707/741, 624, 827
See application file for complete search history.

(56) References Cited

U.S. PATENT DOCUMENTS

| 7,877,735 | B2* | 1/2011 | Todorova | G06F 8/63 717/131 |
| 8,595,237 | B1* | 11/2013 | Chaudhary | G06F 17/301 707/741 |
| 8,600,998 | B1* | 12/2013 | Chaudhary | G06F 16/122 707/741 |

(Continued)

FOREIGN PATENT DOCUMENTS

WO WO-2015088374 A1 6/2015

OTHER PUBLICATIONS

Ali, Q., et al., Docker Containers Performance in VMware vSphere, VMware VROOM! Blog, Oct. 15, 2014, 14 pages.

(Continued)

Primary Examiner — Dennis Truong
(74) Attorney, Agent, or Firm — Hewlett Packard Enterprise Patent Department

(57) ABSTRACT

Example embodiments relate to storage systems for containers. An example storage system may include a set of servers associated with a global namespace for containers, a plurality of storage domains connected under the global namespace, and a processor to identify a storage tree for a container image of a container, where the storage tree is mapped to a storage domain storing the container image, and to clone the container to a second container, where the second container image is stored in a second storage domain.

19 Claims, 6 Drawing Sheets

(56) References Cited

U.S. PATENT DOCUMENTS

| | | | |
|---|---|---|---|
| 10,013,265 B2* | 7/2018 | Kairali | G06K 9/6218 |
| 2005/0060722 A1 | 3/2005 | Rochette et al. | |
| 2006/0123057 A1* | 6/2006 | Zelenka | G06F 17/30088 |
| 2012/0215998 A1* | 8/2012 | Sharp | G06F 3/061 |
| | | | 711/162 |
| 2014/0380009 A1 | 12/2014 | Lemay et al. | |
| 2017/0264684 A1* | 9/2017 | Spillane | H04L 67/1095 |

OTHER PUBLICATIONS

Felter, W., et al., An Updated Performance Comparison of Virtual Machines and Linux Containers, IBM Research Division, Jul. 21, 2014, 12 pages.

Kaplan et al., "AMD Memory Encryption", Apr. 21, 2016, 12 pages.

GRSecurity, "Memory Corruption Defenses", available online at <https://web.archive.org/web/20160430135903/http://grsecurity.net/features.php>, Apr. 30, 2016, 1 page.

Docker, "Build, Ship, and Run Any App, Anywhere", available online at <https://web.archive.org/web/20160725070552/https://www.docker.com/>, Jul. 25, 2016, 7 pages.

Dautenhahn et al., "Nested Kernel: An Operating System Architecture for Intra-Kernel Privilege Separation", ACM ASPLOS, 2015, pp. 191-206.

Belay et al., "Dune: Safe User-level Access to Privileged CPU Features", USENIX OSDI, 2012, pp. 335-348.

\* cited by examiner

STORAGE SYSTEMS FOR CONTAINERS

BACKGROUND

With the expansion of information technology (IT) and related industries, more and more data is getting stored, tiered, and archived. This has further led to development of different storage solutions, such as storage area network (SAN). Storage capacities of such system are to be efficiently managed. For managing the storage capacities of such storage infrastructures, a global namespace may be used.

Containers are paradigms for developing and deploying computer services. Developers and operators value containers because dependencies for running a service are encapsulated inside a single entity.

BRIEF DESCRIPTION OF THE DRAWINGS

The following detailed description references the drawings, wherein.

DETAILED DESCRIPTION

Figure 1:
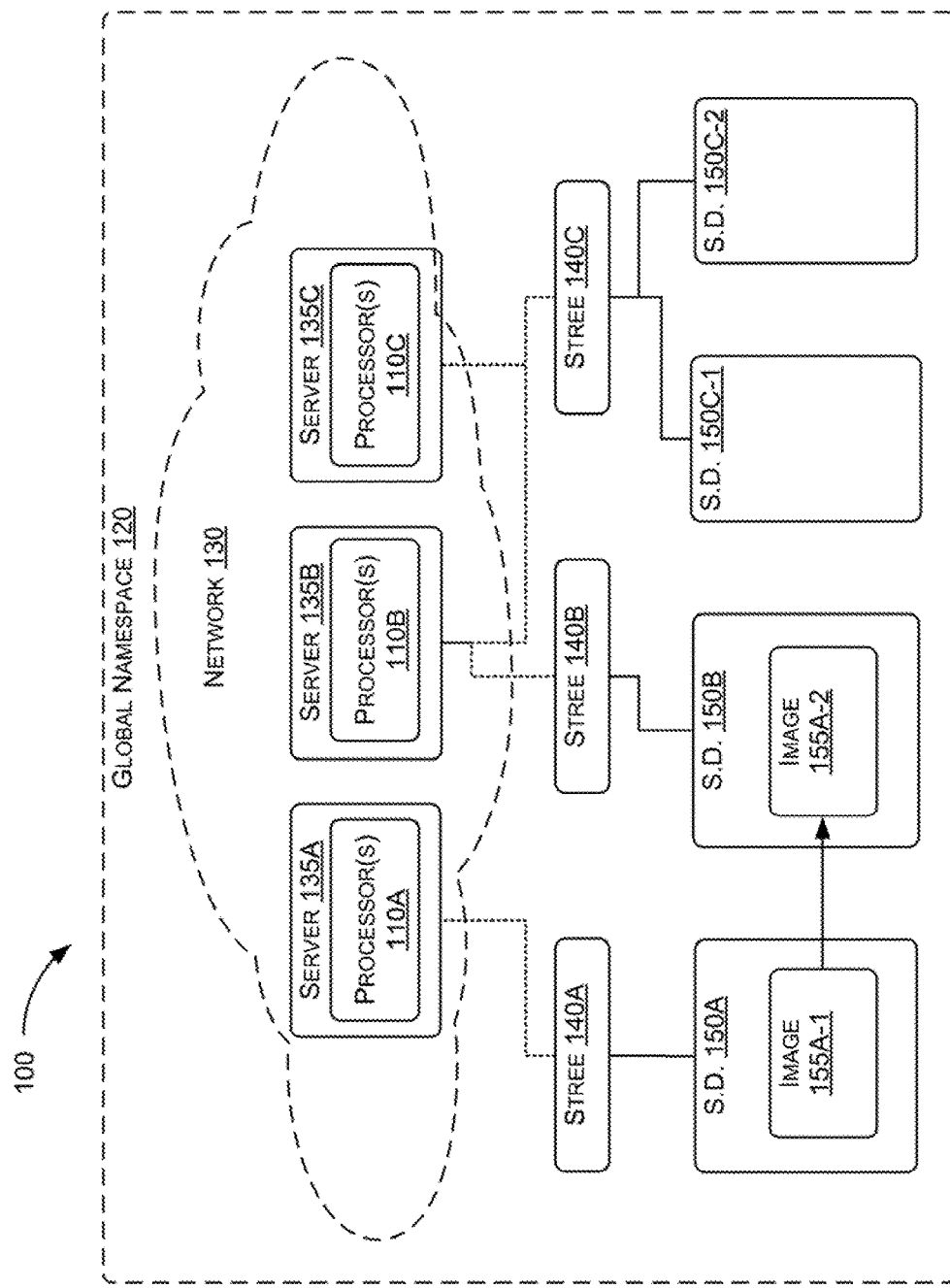
FIG. 1 is a diagram of an example storage system for containers.

Containers are paradigms for developing and deploying computer services. Developers and operators value containers because dependencies for running a service are encapsulated inside a single entity. This makes it easy to transport a service from a development environment to an operating environment. Furthermore, multiple containers may share a physical machine without conflict because differences in libraries and configuration may be encapsulated within each container. Containers may efficiently utilize resources and may be easier to manage than virtual machines because there may be a single operating system per physical machine. Thus, a container-based system may involve fewer operating systems for an administrator to manage and fewer redundant processes since there is only a single kernel per machine and a single set of operating system services (daemons).

A container may include a container image. A container image may be a file system hierarchy which may be copied to create the file system hierarchies for a running container. Thus, multiple running containers may be created from an image. In some instances, a container image may be stored in a storage domain of a first server. However, in some current solutions, each server node of a network copies an image file system hierarchy from a remote server that is hosting it. Therefore, each server node may have its own copy of the image, taking up valuable resources on each node.

Examples disclosed herein address these technical challenges by providing storage systems for multiple servers under a global namespace for containers. In examples herein, data associated with containers, including container images, may be stored in a storage system implemented through a storage infrastructure employing a plurality of storage domains, such as a storage area network (SAN), cloud storage, virtualized storage, and local disks. Storage systems may provide for centralized storage, extraction, and management of data. To manage container data stored in the storages system, global namespaces may be utilized to provide access of files in the storage system independent of their actual physical file locations. A global namespace may provide administrators the ability to add, modify, move, and reconfigure physical file storage without affecting how users view and access data stored in the physical file storage.

In an example disclosed herein, a storage system may include a set of servers associated with a global namespace for containers. A plurality of storage domains may be connected under the global namespace, where a first server of the set of servers comprises a first set of the plurality of storage domains and a second server of the set of servers comprises a second set of the plurality of storage domains. A processor implementing machine readable instructions may cause the storage system to identify a storage tree for a container image of a container, where the storage tree is mapped to a storage domain of the plurality of storage domains which stores the container image. The processor may then cause the storage system to clone the container to a second container comprising a second container image stored in a second storage domain of the second set of storage domains. In this manner, containers may be stored in a scalable storage system having multiple storage domains where containers may be replicated between storage domains of multiple servers.

Referring now to the drawings, FIG. 1 depicts an example storage system 100 for containers. Storage system 100 may be a system for storing computer data, including data associated with containers and their programs. Storage system 100 may utilize a distributed file system to provide storage for containers and their images across a cluster of nodes, such as servers 135A-135C. Storage system 100 may aggregate storage devices on a single node into a storage entity known as a domain. Storage system 100 may then combine multiple domains from multiple nodes in a cluster into a distributed file system accessible to multiple nodes in the cluster via a global namespace.

As an example, storage system 100 may include a plurality of storage domains 150A, 150B, 150C-1, and 150C-2 connected under a global namespace 120 for containers. Global namespace 120 may be associated with a set of servers 135A-135C. Global namespace 120, as used herein, may be understood as a logical layer, which may provide viewing and accessing of files independent of their actual physical file locations. In other words, global namespace 120 may allow access to containers regardless of where the container data has been stored within the storage system 100. A first server, such as first server 135A, may be associated with a first set of storage domains 150A, and a second server 135B may be associated with a second set of storage domains 150B. A set of storage domains may include at least one storage domain, with some having multiple domains, such as storage domains 150C-1 and 150C-2. A storage domain may be a unit of a storage device or multiple storage devices that store data for their corresponding server. As shown in FIG. 1, servers 135A-135C may be connected by a network 130, which may be, for example, a local area network, a wireless network, a cloud network, or the internet.

Furthermore, storage system 100 may include processors 110 (processors 110A-110C). Each processor 110 may include one or more microprocessors, microcontrollers, digital signal processors, central processing units (CPUs), state machines, logic circuitries, virtual machines, and/or other hardware devices suitable for retrieval and execution of computer-readable instructions. Further, functions of the various elements shown in the figures, including any functional blocks labeled as "processor(s)", may be provided through the use of dedicated hardware as well as hardware capable of executing computer-readable instructions. In some examples, processor 110A may be associated with server 135A, processor 110B may be associated with server 135B, and processor 110C may be associated with server 135C.

A processor, such as processor 110A as illustrated, may implement machine readable instructions that cause storage system 100 to identify a storage tree (e.g., 140A) for a container image (e.g., 155A-1) of a container. A storage tree may be a file directory in the global namespace 120. A storage tree may be accessible to any or all servers associated with the global namespace 120. A storage tree may store user created files and directories. In some examples, a storage tree may include a manifest and a mount point. Within the directory of the storage tree, the manifest may include metadata not accessible by the container of the storage tree. A container image (described in detail below) for the container may be mapped below the mount point in the storage tree.

Furthermore, in some examples, a storage tree may be mapped to a storage domain (e.g., 150A) of the plurality of storage domains. For example, a storage domain may be a unit of storage for holding data. The storage domain may be associated with multiple storage attributes. The storage attributes may be fault containment attribute of a storage device, price associated with the storage device, performance of the storage device, and geographic location of the storage device. Thus, the storage tree may provide for mapping of the storage domains to the global namespace 120 that encompasses multiple storage domains.

A storage domain 150A may store a container image, such as image 155A-1. A container image may be a file system hierarchy which may be copied to create the file system hierarchies for a running container. A container image may thus include a single file path or a complex directory hierarchy.

Additionally or as an alternative, processors 110 may implement machine readable instructions that cause storage system 100 to identify a management tree for the container image, such as container image 155A-1. A management tree may be a parent namespace entity of the storage tree, and the management tree may include data management policies for containers corresponding to all child storage trees of the management tree. This is further described below with reference to FIG. 2. Data management policies may define rules for managing container data stored in storage domains corresponding to the management tree. Example data management policies may include, for instance, data retention policies, authentication policies, data access policies, policies defining user quotas, and policies defining anti-virus mechanisms to be used for the data associated with the management trees.

Continuing to refer to FIG. 1, processors 110 may implement machine readable instructions that clone a container to a second container having a second container image (e.g., 155A-2) stored in a second storage domain (e.g., 150B) of the second set of storage domains. In some examples, a container image may be stored across a plural set of storage domains such as storage domains 150C-1 and 150C-2. In some examples, a storage tree (e.g., 140A) of a container image (e.g., 155A-1) may also be correspondingly cloned to a second storage tree (e.g., 140B), where the second storage tree is for a second container image (e.g., 155A-2).

In some examples, the cloning of container image 155A-1 to image 155A-2 may be deployed via copy on write, which may be a mechanisms that copies an instance of memory upon a write request rather writing the original instance. For example, upon a request to access a first container having container image 155A-1, a copy of the container image (e.g., 155A-2) may be created. In examples herein, instead of filesystem archives, container images may be distributed as pathnames: the full pathname of the image in the global namespace. The pathname may have much less data than a file system archive. To clone to a new instance of a container, storage system 100 may clone the directory hierarchy at the given path. Thus, storage system 100 may need only one copy of a container image (e.g., 155A-1), reducing waste of storage resources and decreasing start up time.

As a specific example, processor 110 may cause the storage system 100 to receive instructions to modify a container image such as image 155A-1. In response, storage system 100 may clone a storage tree 140A to a second storage tree 140B along with the cloning of image 155A-1 on storage domain 150A to second image 155A-2 on storage domain 150B. Storage system 100 may then modify the second image 155A-2 based on the instructions to modify the image 155A-1.

Furthermore, in some examples, a container image such as image 155A-1 may be a golden image of a container. A golden image may be a template for cloning additional images, and in some examples, may not be edited due to copy on write. A golden image may contain information of a computing environment determined by an administrator to be ideal for the container.

Additionally, in some examples, processor 110 may cause storage system 100 to identify a third storage tree for container data of a container. Container data may include all data pertinent to a container that is not mapped to its container image. For example, additional container data may include, for example, metadata, logs, and user data. The third storage tree may be mapped to a storage domain, which may be a same or different storage domain as that storing the container image. In some examples, the third storage tree may be cloned to a fourth storage tree, where the fourth storage tree is for container data of a second container.

Such a distributed storage system as storage system 100 may allow efficient and secure storage and cloning of containers. Example storage systems herein may also provide for fault resiliency to avoid or minimize data unavailability. For example, as the data can be effectively spread and managed, an administrator may be provided the flexibility to allocate the storage domains and map the same to entities within a global namespace. Consequently, impact of faults on the overall storage system may now be contained in a sub-set of the storage system defined by storage trees. In other words, if a fault in a storage domain occurs, it may impact the storage trees mapping to it and may have limited or no impact on other storage trees.

It should be understood that FIG. 1 illustrates an example conceptual model of a storage system 100 for containers, and that the structure of a storage system taught herein is not limited to that shown.

Figure 2:
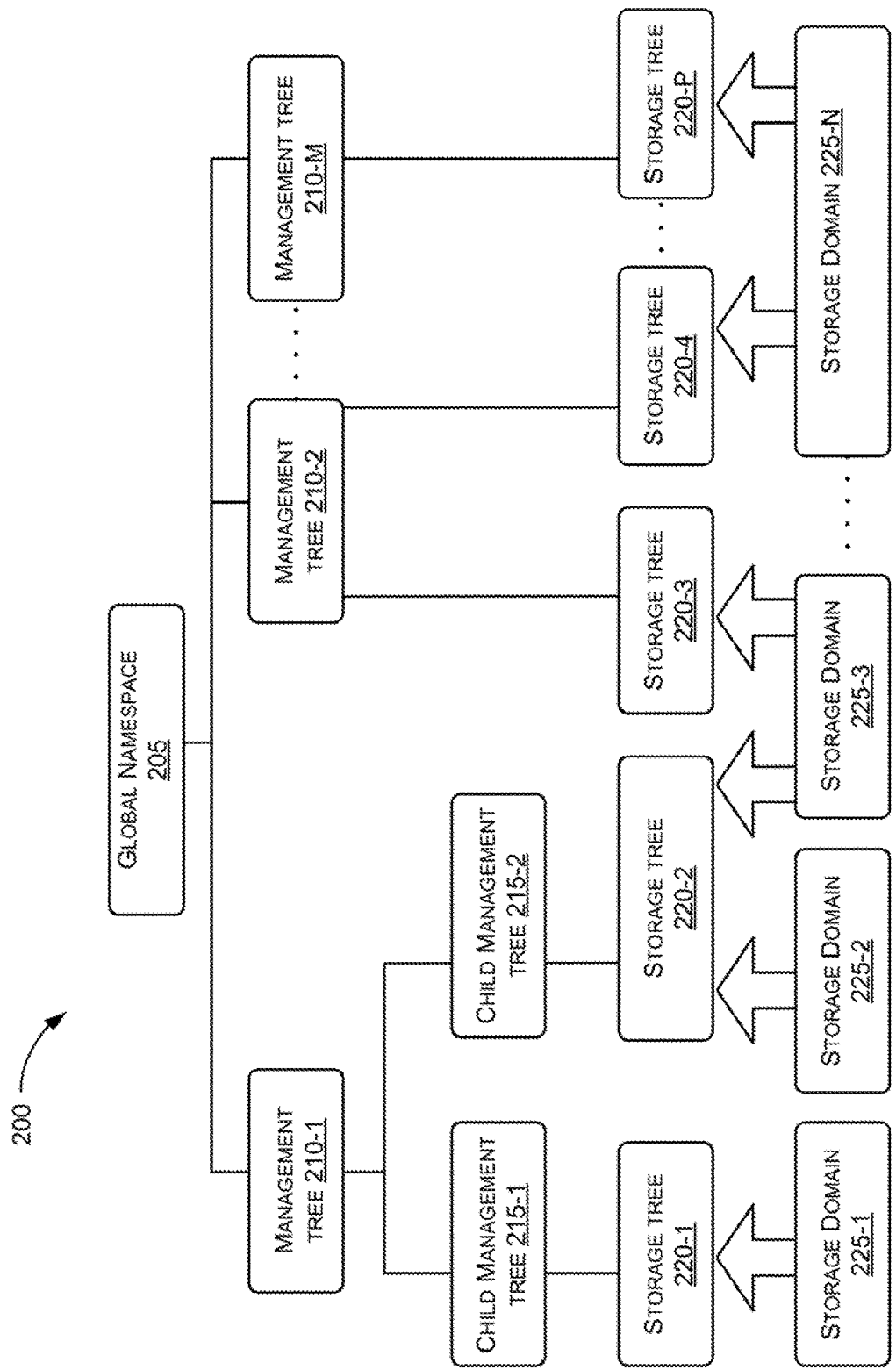
FIG. 2 is a diagram of an example storage system architecture for containers.

FIG. 2 illustrates an example storage network architecture 200 for containers. For the sake of brevity, certain components, such as switches, pair of servers and storage in highly available (HA) configurations, just a bunch of disks (JBOD) enclosures, directories, files, segments, and files systems have not been illustrated in the present figure. In an example, the storage network architecture 200 is a global namespace based scale out storage network. The present example provides for connecting multiple storage domains under a single namespace, represented as global namespace 205.

In some examples, global namespace 250 may be logically partitioned into multiple management domains known as management trees, such as management tree 210-1, management tree 210-2, and management tree 210-M. The management trees 210-1, 210-2, ... and 210-M (collectively referred to as management trees 210) may each further be associated with one or more data management policies pertaining to storage trees mapped below the management tree. The data management policies may describe rules for providing access and managing data pertaining to containers mapped to the storage trees. For instance, the data management policies may describe authentication policies, data erasure policies, data retention policies, anti-virus policies, and user storage space allocation policies. In some examples, management trees may implement default data management policies, such as those set by an administrator.

In some examples an administrator may choose to impose same data management policies on all units or may have separate data access policies for some or all of the units. In case separate data management policies are to be imposed, unit-wise data security and control may be provided by way of child management trees 215-1 ... 215-2 branching from a management tree 210. The child management trees 215-1 ... 215-2 may be collectively referred to as child management trees 215 and may be individually referred to as child management tree 215. A child management tree 215 may accordingly include the data management policies for managing data pertaining to a subset of containers.

Referring to FIG. 2, the management tree 210-1 is illustrated to have the child management trees 215-1 and 215-2. As illustrated, the child management trees 215 and the management trees 210, such as the management tree 210-M having no child management tree nodes, may in turn may map to one or more storage trees, such as storage tree 220-1, storage tree 220-2, storage tree 220-3, ... and storage tree 220-P (collectively referred to as storage trees 220). While the management trees 210 and the child management trees 215 provide for policy management, storage capacity management may be provided by way of the storage trees 220, as explained in the following sections. Storage trees 220 may map to container images of containers stored in the storage domains 225-1, 2, ..., N (collectively referred to as storage domains 225).

A storage tree 220 may be understood to be a namespace entity below which files and directories, including container images and data, may reside. The storage tree 220 may also function to provide control points in the namespace where various functionalities such snapshot, disaster recover (DR) replication, and fault management policies may be implemented. Additionally, the storage tree 220 may provide for capacity management by specifying limits on the size of the storage tree 220. Further, additional data management policies can be set at the storage tree 220. Examples of such policies include, allocation policy of how objects in the storage tree 220 may spread across multiple storage domains 225, quota limits, snap-schedule, DR snap policies, Archive Journal, and Metabox/Express query ON/OFF.

In an example, for any object in the storage tree 220, the data management policies may be inherited from the storage tree 220, and if the data management policy is not set at the storage tree 220, the data management policy from the management tree 210 or 215 corresponding to the storage tree may be enforced. If the same policy is set on both storage tree 220 and its parent management tree, the data management policy of the storage tree 220 may override that of management tree 210 or 215. Thus, the data management policies may be checked from bottom of the hierarchy to the top, i.e., from the storage tree level to the root of the global namespace 205. However, certain exceptions may be defined in case of a policy conflict, for instance, in case quota allocation is defined by both the storage tree 220 and the parent management tree 210 or 215, the quota allocation policy defined by the management tree 210 may be enforced.

In another example, one or more storage domains 225-1, 2, ..., N may be determined. Once the storage domains 225-1, 2, ..., N (collectively referred to as storage domains 225) are determined, the same are mapped to the storage tree 220. A storage domain 225 may be understood to be a unit of capacity block in the storage network architecture 200. The storage domain 225 may be implemented, for instance, through a storage area network (SAN) couplet, a redundant array of independent disks (RAID) couplet, a disk array, a JBOD enclosure, virtualized memory, or a local disk.

The storage domains 225 may each be associated with one or more attribute-based storage blocks, the storage attributes being, for instance, performance of the storage block, fault containment, location of the storage block, and pricing of the storage block. Such storage attributes may be used for determining which of the storage domains 225 are to be selected for associating with a storage tree from amongst the storage trees 220. In such a case, the storage domains 225 that may provide storage capacity to a container image may be selected based on the storage attributes. These storage attributes may be defined in the corresponding management tree 210.

As mentioned earlier, a storage tree 220 may map to one or more storage domains 225. As per the present illustration, the storage tree 220-1 maps to the storage domain 225-1 and the storage tree 220-2 maps to the storage domain 225-2 and 225-3. Further, in other examples, the storage domain 225 may be mapped to by multiple storage trees 220. For instance, multiple storage trees may map to multiple container images stored on a same storage domain 225.

The mapping of multiple storage trees 220 to same storage domain is also illustrated in FIG. 2 and may be better understood with the following example. Continuing to refer to FIG. 2, the container images corresponding to the management tree 210-2 may be stored in the storage domain 225-3 and the storage domain 225-N, where corresponding storage trees 220-3 and 220-4 may provide for capacity management. Further, the data pertaining to container images corresponding to the management tree 210-M may also be stored in the storage domain 225-N, where the storage tree 220-P provides for capacity management. Thus, the storage domain 225-3 is shared between the storage tree 220-2 and the storage tree 220-3, and the storage domain 225-N is shared between the storage tree 220-4 and the storage tree 220-P. In the present example, the management trees 210-1, 210-2 and 210-M may provide for data security, as the data being stored in the storage domain 225-3 and storage domain 225-N, by executing corresponding data management policies.

In an example, the management trees 210, the child management trees 215, and the storage trees 220 may be realized in multiple ways. For instance, the management trees 210, the child management trees 215, and the storage trees 220 may map to directories in the global namespace 205. However, in other examples, the child management trees 215, and the storage trees 220 may be stored in a database, and a node, for instance, corresponding to a management tree 210 may be provided in the namespace and this node may function as an entry point of hierarchy defined by the management tree 210. Thus, the storage network architecture 200 may implement property inheritance model of the management, child management, and storage trees in different ways in different implementations.

The storage network architecture 200 may be expressed logically in terms of following equations:

$$\{\text{Global Storage Space}\} = U_1^N \{\text{Storage Domain}\} \{i=1, \ldots, N\} \quad (1)$$

$$\{\text{Global Namespace}\} \Rightarrow \{\text{Global Storage Space}\} \quad (2)$$

$$\{\text{Global Namespace}\} = U_1^M \{\text{Management Tree}_i\} \quad (3)$$

$$\{\text{Management Tree}\} = \{U_1^K \{\text{Child Management Tree}_j\} | U_1^P \{\text{Storage Tree}_i\}\} \quad (4)$$

$$\{\text{Storage Tree}_i\} \Rightarrow U_1^R \{\text{Storage Domain}_i\} \{R=1, \ldots, \} \quad (5)$$

As can be gathered from equation (1), a global storage system, such as system 100, includes a plurality of storage domains 225, say 1 to N. Thus, the storage domains 225 make up storage space, i.e., available capacity. Equation (2) represents that global namespace maps to global storage space and is realized in the global storage system. Subsequent equations illustrate the components of the global namespace as per present architecture 200.

Equation (3) illustrates that the global namespace comprises a plurality of management trees, such as management trees 210. In other words, global namespace includes the management trees 210. The management trees 210 may in turn further include either child management trees which in turn comprise further components or storage trees, as represented in equations 4 and 5. Equation (4) illustrates that each management tree 210 may include one or more child management trees 215 or one or more storage trees 220. It will be appreciated that the child management trees 215 may also be considered as a management tree 210 may be represented by the equation (4) above.

Further, as mentioned earlier, a storage tree 220 may map to one or more storage domains 225 and the same is represented is by equation (5), which indicates that each storage tree 220 may in turn include one or more storage domains 225. Accordingly, equations (4) and (5) correspond to the hierarchical structure represented in the storage network architecture 200 illustrated in FIG. 2.

Figure 3:
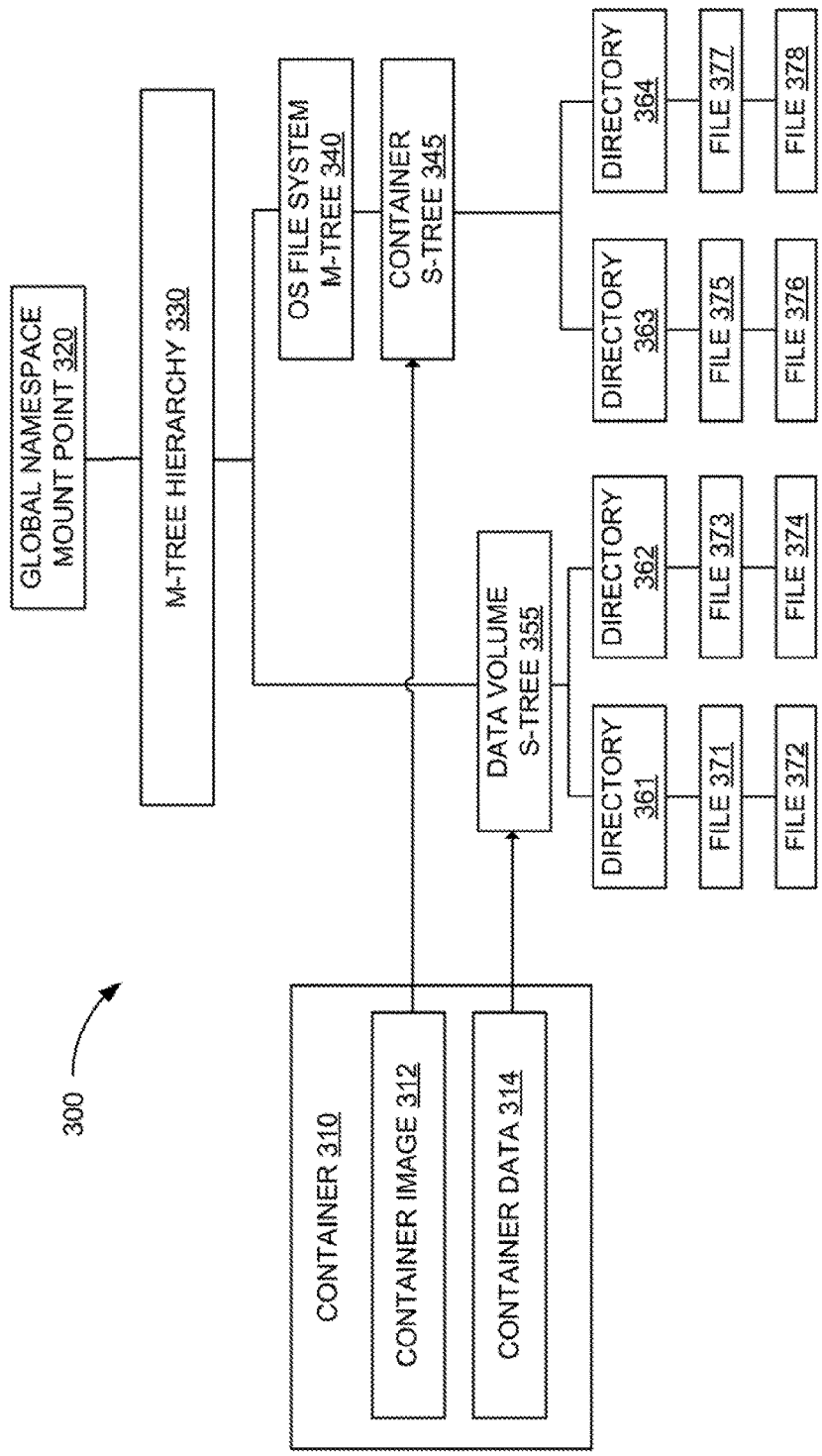
FIG. 3 is a diagram of an example file hierarchy used in example storage systems for containers.

FIG. 3 depicts an example file hierarchy 300 used in example storage systems for containers. File hierarchy 300 may complement the example storage network architecture 200 illustrated in FIG. 2. File hierarchy 300 may illustrate the mapping of a container 310 to the file hierarchy of a global namespace.

File hierarchy 300 may include a global namespace mount point 320, which may attach the file hierarchy 300 to the global namespace. As illustrated in detail in FIG. 2, file hierarchy may begin at the top level with a management tree hierarchy, illustrated here as m-tree hierarchy 330. M-tree hierarchy may be associated with one or more data management policies pertaining to storage trees mapped below it.

In some examples an administrator may choose to impose separate data access policies for some or all of the storage trees below the m-tree hierarchy 330. Such separate policies may be provided by way of a child management tree, illustrated here as OS file system m-tree 340. OS file system m-tree 340 may include the data management policies for managing data pertaining to a container s-tree 345. The policies of m-tree 340 may be associated with the operating system that executes the container. On the other hand, m-tree hierarchy 330 may map to a second s-tree, illustrated here as data volume s-tree 355. S-tree 355 may follow data management policies determined by m-tree hierarchy 330 because it does not map to another m-tree unlike container s-tree 345 which maps to m-tree 340.

Container 310 may include a container image 312 and container data 314. Container image 312 may include the files for running a container service, and container data 314 may include other files associated with the container. As shown in FIG. 3, container image 312 may map to container s-tree 345. Container data 314, on the other hand, may map to data volume s-tree 355. Container data 314 may be mapped below data volume s-tree 355, including directory 361 and directory 362. Each of the directories may include files, such as files 371-374. Similarly, the file system of container image 312 may be mapped below container s-tree 345, including directory 363 and directory 364. Each of the directories may include files, such as files 375-378.

Figure 4:
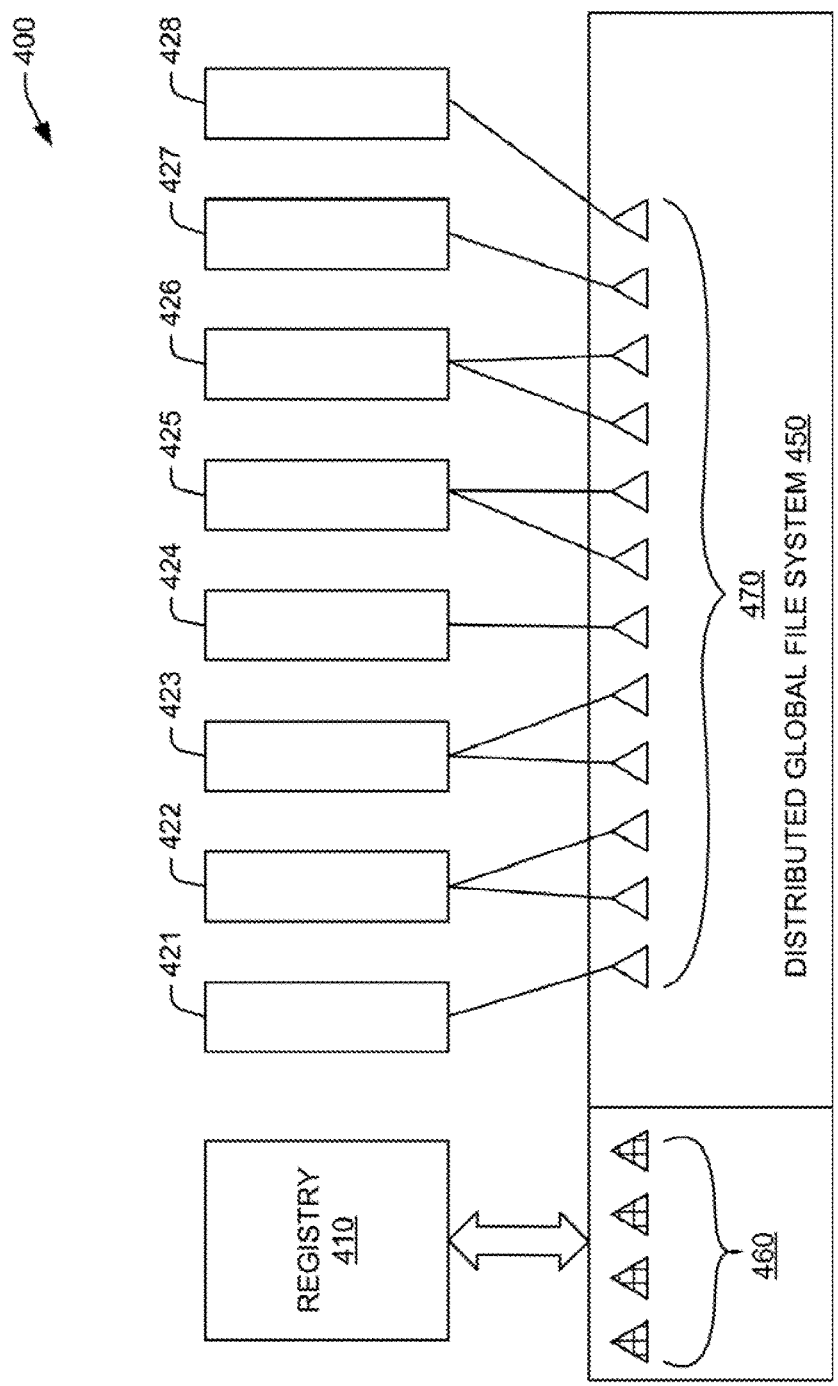
FIG. 4 is a diagram of an example illustration of instantiating containers from a distributed global file system.

FIG. 4. depicts an example illustration 400 of instantiating containers 421-428 from a distributed global file system 450. Global distributed file system 450 may represent an aggregation of multiple storage domains of a system, connected by a global namespace. The global file system 450 may include at least one file system 470 associated with a container, such as a container image. Running containers 421-428 may be instantiated from container file systems 470. As illustrated, a running container, such as container 422, 423, 425, and 426 may instantiate from multiple file systems 470. Furthermore in some examples (not illustrated), a single file system 470 may be used to instantiate multiple running containers.

Illustration 400 also shows golden images 460. Golden images 460 may be templates for cloning container images, and in some examples, may not be edited due to copy on write features, as depicted as the line separating the golden images 460 from the file systems 470. A golden image 460 may contain information of a computing environment determined by an administrator to be ideal for the running containers 421-428. Accordingly, the golden images 460 may be loaded into a registry 410. File systems 470 may copy particular container images from registry 410, based on which services are called upon by running containers 421-428.

File systems 470 may reside on multiple storage domains of the distributed global file system 450. Furthermore, running containers 421-428 may be executed on multiple resources across multiple computing devices. Due to the global file system connected by the global namespace, a container image (e.g., a file system 470) stored in one storage domain may be cloned to another storage domain. However, in the perspective of the running containers 421-428, the physical location of a particular file system 470 does not affect the integrity of the system.

Figure 5:
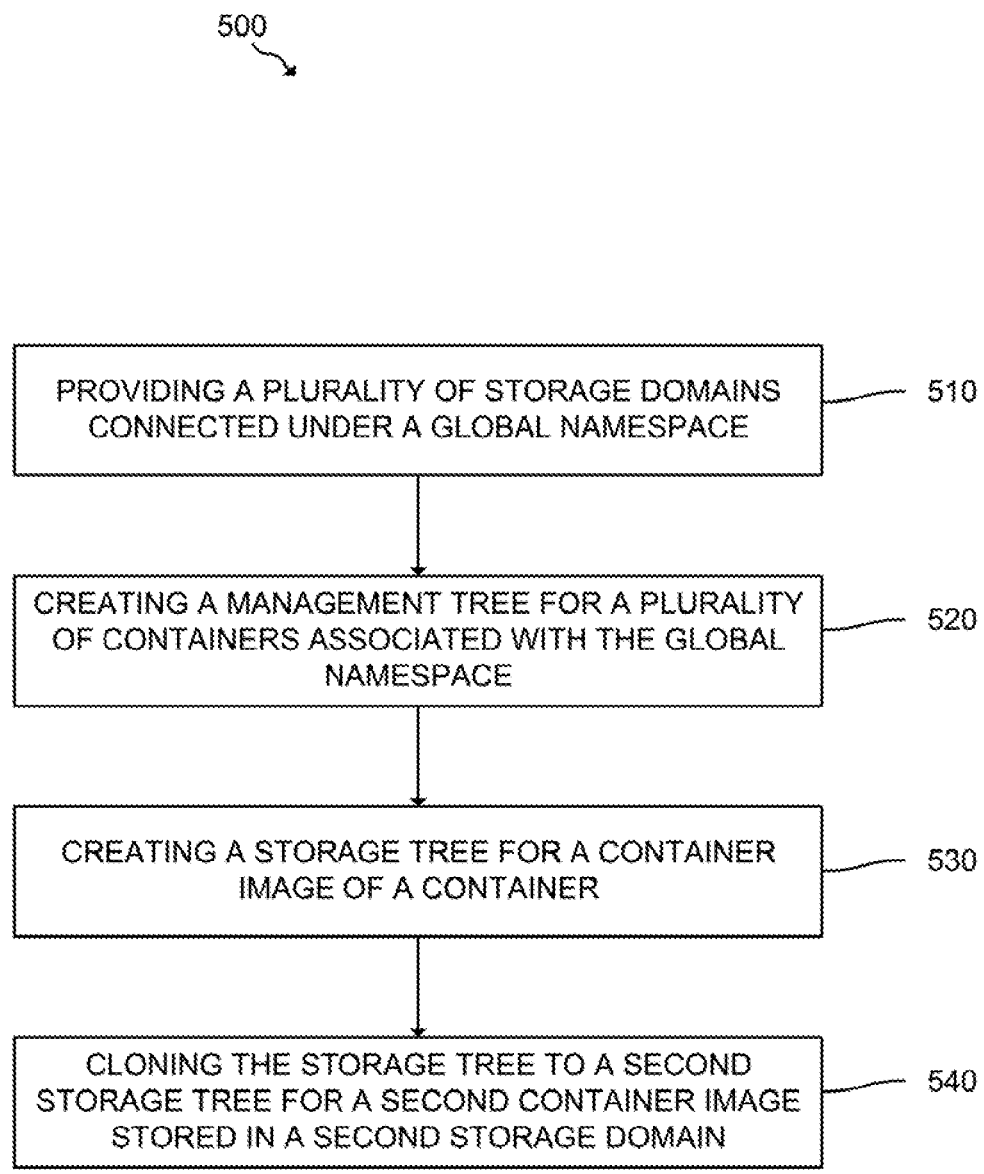
FIG. 5 is a flowchart of an example method for cloning a storage tree for a container to a second storage tree for a second container.

Referring now to FIG. 5, example method 500 illustrates cloning a storage tree for a container to a second storage tree for a second container. Although execution of method 500 is described below with reference to the examples illustrated in the examples herein, other suitable devices for execution of this method should be apparent. Method 500 may be implemented in the form of executable instructions stored on a machine-readable storage medium and/or in the form of electronic circuitry.

In an operating 510, a plurality of storage domains connected under a global namespace for containers may be provided. For example, storage domains 150A, 1508, 150C, and 150D may be connected under global namespace 120. A first server 135A may have a first set of the plurality of storage domains (e.g., S.D. 150A), and a second server 135B may have a second set of the plurality of storage domains (e.g., 150B). Furthermore, in some examples, a third server 135C may have a third set of storage domains (e.g., 150C and 150D).

In an operation 520, a management tree may be created for a plurality of containers associated with the global namespace. While not illustrated in storage system 100 of FIG. 1, a management tree may be a parent namespace entity of storage trees, such as at least one of storage trees 140A-140C. The management tree may include data policies for containers corresponding to all child storage trees of the management tree.

In an operation 530, a storage tree may be created for a container image of a container. The storage tree, such as a storage tree 140A, may be a file directory in the global namespace 120, and may be mapped to a storage domain, such as S.D. 150A. The storage domain mapped by the storage tree may store the container image. For example, storage tree 140A may map to storage domain 150A storing container image 150A. As explained previously herein, the storage tree may be a child directory of the management tree created in operation 530.

In an operation 540, the storage tree, such as storage tree 140A, may be cloned to a second storage tree, such as storage tree 140B. Storage tree 140B may be mapped to a second container image 1508 which may be a cloned of container image 150A. In such a manner, containers may be instantiated across the distributed storage system from an original container image.

Figure 6:
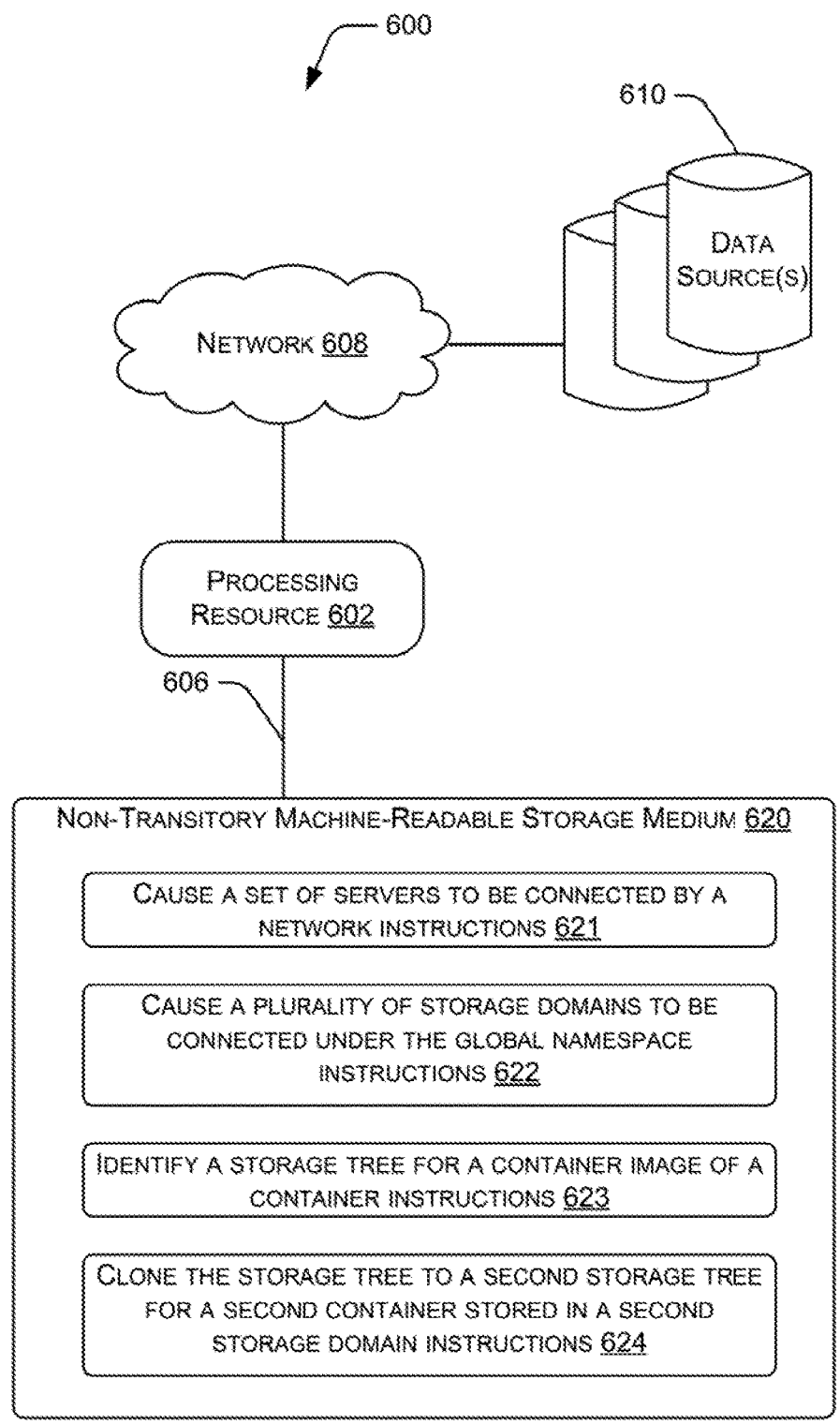
FIG. 6 is a diagram of an example network environment running a computer readable storage medium storing instructions for implementing an example storage system for containers.

FIG. 6 illustrates an example network environment 600 implementing a non-transitory computer readable medium 600 for implementing an example storage system. The network environment 600 may be a public networking environment or a private networking environment. In one implementation, the network environment 600 includes a processing resource 602 communicatively coupled to a non-transitory computer readable medium 620 through a communication link 606.

For example, the processing resource 602 can be a processor of a network device. The non-transitory computer readable medium 620 can be, for example, an internal memory device or an external memory device including any electronic, magnetic, optical, or other physical storage device that contains or stores executable data accessible to processing resource 602. Thus, medium 620 may be, for example, a Random Access Memory (RAM), an Electrically Erasable Programmable Read-Only Memory (EEPROM), a storage device, an optical disc, and the like. Medium 604 may be a non-transitory storage medium, where the term "non-transitory" does not encompass transitory propagating signals.

In one implementation, the communication link 606 may be a direct communication link, such as one formed through a memory read/write interface. In another implementation, the communication link 606 may be an indirect communication link, such as one formed through a network interface. In such a case, the processing resource 602 can access the non-transitory computer readable medium 620 through a network 608. The network 608 may be a single network or a combination of multiple networks and may use a variety of different communication protocols.

The processing resource 602 and the non-transitory computer readable medium 620 may also be communicatively coupled to data sources 610 over the network 608. The data sources 610 can include, for example, databases and computing devices. The data sources 610 may be used by the database administrators and other users to communicate with the processing resource 602.

In one implementation, the non-transitory computer readable medium 620 includes a set of computer readable instructions, such as instructions for implementing the storage system 100 of FIG. 1. The set of computer readable instructions, referred to as instructions hereinafter, can be accessed by the processing resource 602 through the communication link 606 and subsequently executed instructions 621, 622, 623, and 624. These instructions may respectively perform the following: cause a set of servers to be connected by a network, cause a plurality of storage domains to be connected under a global namespace, identify a storage tree for a container image of a container, and clone the storage tree to a second storage tree for a second container stored in a second storage domain. For discussion purposes, the execution of the instructions by the processing resource 602 has been described with reference to various components introduced earlier with reference to description of the previous figures.

The foregoing disclosure describes a number of example embodiments for storage systems for containers. The disclosed examples may include systems, devices, computer-readable storage media, and methods for implementing storage systems for containers. For purposes of explanation, certain examples are described with reference to the components illustrated in FIGS. 1-6. The functionality of the illustrated components may overlap, however, and may be present in a fewer or greater number of elements and components. All or part of the functionality of illustrated elements may co-exist or be distributed among several geographically dispersed locations. Moreover, the disclosed examples may be implemented in various environments and are not limited to the illustrated implementations.

Further, the sequence of operations described in connection with FIGS. 1-6 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

What is claimed is:

1. A storage system, comprising:
a plurality of storage domains connected under a global namespace for containers, wherein the global namespace is associated with a set of servers, a first server of the set of servers is associated with a first set of the plurality of storage domains, and a second server of the set of servers is associated with a second set of the plurality of storage domains;
a processor; and
a non-transitory storage medium storing machine readable instructions executable on the processor to:

identify a storage tree for a first container image of a first container, the storage tree being a file directory in the global namespace, wherein the storage tree is mapped to a first storage domain of the plurality of storage domains, wherein the first storage domain stores the first container image;

receive instructions to modify the first container image;

in response to the instructions to modify the first container image, clone the first container to a second container comprising a second container image stored in a second storage domain of the second set of storage domains; and modify the second container image in the second storage domain based on the instructions to modify the first container image.

2. The storage system of claim 1, wherein the storage tree is mapped to plural storage domains of the plurality of storage domains, wherein the first container image is stored across the plural storage domains.

3. The storage system of claim 1, wherein the first container image is a golden image of the first container.

4. The storage system of claim 1, wherein the machine readable instructions are executable on the processor to clone the storage tree to a second storage tree, and wherein the second storage tree is for the second container image.

5. The storage system of claim 4, wherein the machine readable instructions are executable on the processor to:

identify a third storage tree for container data of the first container, the third storage tree being a file directory in the global namespace, wherein the third storage tree is mapped to the first storage domain of the plurality of storage domains, wherein the first storage domain stores the container data; and clone the container data to a second container data.

6. The storage system of claim 1, wherein the storage tree comprises a manifest and a mount point, wherein the manifest comprises metadata not accessible by the first container, and the first container image is mapped below the mount point.

7. The storage system of claim 1, wherein the instructions are executable on the processor to:

identify a management tree for the first container image, wherein the management tree comprises a parent namespace entity of the storage tree, and the management tree comprises data management policies for containers corresponding to child storage trees of the management tree, and wherein the storage tree comprises a further data management policy; and detect a conflict between the further data management policy and a given data management policy of the management tree.

8. The storage system of claim 7, wherein the instructions are executable on the processor to:

in response to detecting the conflict, select a data management policy to apply from among the further data management policy and the given data management policy.

9. A non-transitory computer-readable storage medium comprising instructions that, when executed, cause a system to:

manage information associating a plurality of storage domains connected under a global namespace for containers with a set of servers, wherein the set of servers is associated with the global namespace, a first server of the set of servers comprises a first set of the plurality of storage domains, and a second server of the set of servers comprises a second set of the plurality of storage domains;

identify a first storage tree for a first container image of a first container, wherein the first storage tree is a file directory in the global namespace, and the first storage tree is mapped to a first storage domain of the plurality of storage domains, wherein the first storage domain stores the first container image; and receive instructions to modify the first container image;

in response to the instructions to modify the first container image, clone the first storage tree to a second storage tree for a second container image stored in a second storage domain of the second set of storage domains, and clone the first container to a second container comprising the second container image; and modify the second container image in the second storage domain based on the instructions to modify the first container image.

10. The non-transitory storage medium of claim 9, wherein the first storage tree is mapped to plural storage domains of the plurality of storage domains, wherein the first container image is stored across the plural storage domains.

11. The non-transitory storage medium of claim 9, wherein the first container image is a golden image of the first container.

12. The non-transitory computer-readable storage medium of claim 9, wherein the instructions when executed cause the system to:

identify a third storage tree for container data of the first container, wherein the third storage tree is mapped to a given storage domain of the plurality of storage domains, wherein the given storage domain stores the container data; and clone the third storage tree to a fourth storage tree, wherein the fourth storage tree is for container data of another container.

13. The non-transitory computer-readable storage medium of claim 9, wherein the first storage tree comprises a manifest and a mount point, wherein the manifest comprises metadata not accessible by the first container, and the first container image is mapped below the mount point.

14. The non-transitory computer-readable storage medium of claim 9, wherein the instructions when executed cause the system to:

identify a management tree for the first container image, wherein the management tree comprises a parent namespace entity of the first storage tree, and the management tree comprises data management policies for containers corresponding to child storage trees of the management tree, and wherein the storage tree comprises a further data management policy; and detect a conflict between the further data management policy and a given data management policy of the management tree.

15. The non-transitory computer-readable storage medium of claim 14, wherein the instructions when executed cause the system to:

in response to detecting the conflict, select a data management policy to apply from among the further data management policy and the given data management policy.

16. A method performed by a system comprising a hardware processor, comprising:

providing a plurality of storage domains connected under a global namespace for containers, wherein the global namespace is associated with a set of servers connected by a network, a first server of the set of servers is associated with a first set of the plurality of storage domains, and a second server of the set of servers is associated with a second set of the plurality of storage domains;

creating a management tree for a plurality of containers associated with the global namespace, wherein the management tree comprises a parent namespace entity of a first storage tree, and the management tree comprises data management policies for containers corresponding to child storage trees of the management tree;

creating the first storage tree for a first container image of a first container, wherein the first storage tree is a file directory in the global namespace and comprises a further data management policy, and the first storage tree is mapped to a first storage domain of the plurality of storage domains, wherein the first storage domain stores the first container image;

receiving instructions to modify the first container image;

in response to the instructions to modify the first container image, cloning the first storage tree to a second storage tree for a second container image stored in a second storage domain of the second set of storage domains, and cloning the first container to a second container comprising the second container image;

modifying the second container image based on the instructions to modify the first container image; and detecting a conflict between the further data management policy and a given data management policy of the management tree.

17. The method of claim 16, wherein the first storage tree is mapped to plural storage domains of the plurality of storage domains, wherein the first container image is stored across the plural storage domains.

18. The method of claim 16, further comprising:

identifying a third storage tree for container data of the first container, wherein the third storage tree is mapped to a given storage domain of the plurality of storage domains, wherein the given storage domain stores the container data; and cloning the third storage tree to a fourth storage tree, wherein the fourth storage tree is for container data of another container.

19. The method of claim 16, further comprising:

in response to detecting the conflict, selecting a data management policy to apply from among the further data management policy and the given data management policy.

* * * * *